Patented Sept. 6, 1932

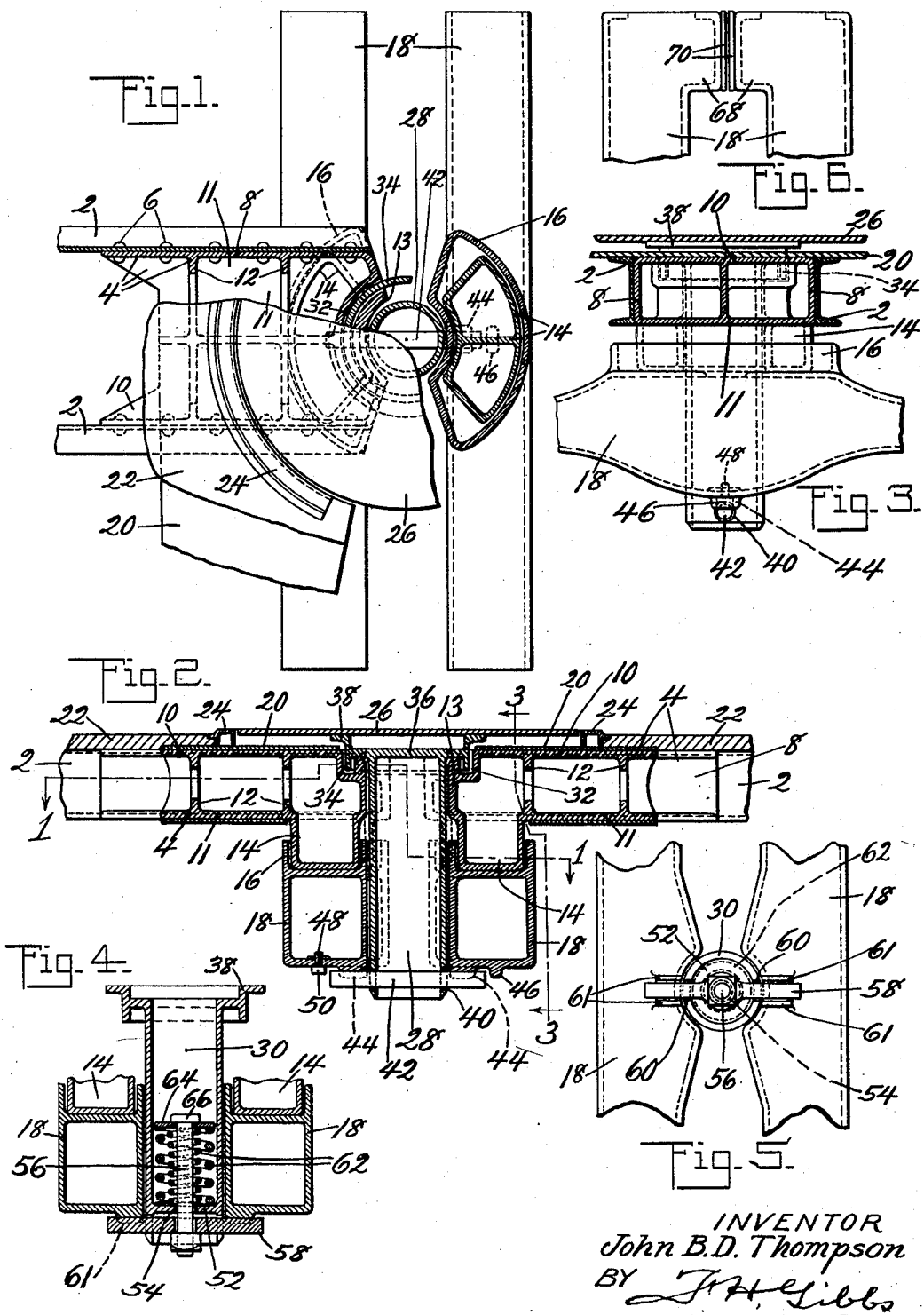

1,875,958

UNITED STATES PATENT OFFICE

JOHN B. D. THOMPSON, OF UNION CITY, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed November 1, 1930. Serial No. 492,691.

This invention relates to articulated railway cars of the type in which the adjacent end portions of two car bodies are supported by a common or buffing truck, and the invention has specific reference to the articulation joint for two car bodies.

One object of this invention is the provision of an articulation joint for the adjacent end portions of two car bodies which will permit the car bodies to swivel horizontally and at the same time will prevent excessive relative sidewise and vertical shifting of said bodies.

Another object of this invention is the provision of a new and improved means for supporting the foot plate which is arranged between the adjacent end portions of two car bodies.

Still another object of this invention is the provision of a new and improved body connection casting for use with the bodies of an articulated car.

A further object of this invention is the provision of a foot plate supporting member for the adjacent end portions of two bodies of an articulated car which is adapted to prevent relative sidewise and vertical shifting of the bodies, and which is further adapted to take the buffing shocks to which the bodies are subjected.

Other objects and advantages of this invention will be apparent from the following description taken in conjunction with the accompanying drawing in which Figure 1 is a view looking down on parts of the underframes of two adjacent bodies of an articulated car, showing the bolsters of a pivot truck associated therewith, the section being taken on the line 1—1, Fig. 2.

Fig. 2 is a sectional view through the articulation joint of the present invention.

Fig. 3 is a sectional view on the line 3—3, Fig. 2.

Fig. 4 is a sectional view showing a modification of the invention shown in Fig. 2; the view showing a modified form of foot plate supporting member and the means for positioning the same.

Fig. 5 is an inverted plan view of the construction shown in Fig. 4, and

Fig. 6 is a fragmentary top plan view of a modified form of bolster construction.

Referring now more particularly to the drawing in which similar characters of reference designate similar parts in the several views, inasmuch as the specific construction of the bodies forms no part of the present invention, they are not illustrated, and it is to be understood that the bodies may assume any preferred or desired form. Further, while a pivot truck is associated with the articulation joint of the present invention, the specific form thereof has no bearing on the present invention with the exception that the truck comprises two bolsters, and in the drawing only the bolsters are shown, it being understood that the truck itself may assume any preferred or desired construction.

The car bodies, of course, have an underframe and the same includes spaced channels 2 defining center sills and between the channels body center castings 4 are secured; rivets 6 connecting the side walls 8 of said castings to said center sills. The castings comprise top and bottom walls 10 and 11 respectively, reinforced by suitable internal webs or stiffeners 12. Formed with the front ends of the castings are depending arcuate or recessed projections 13 and body bearings 14 are provided which depend from the bottom walls of the castings, as shown clearly in Fig. 2, said body bearings being alined with and engaged in segmental truck bearings 16, carried by truck bolsters 18, which latter are suitably mounted upon and form parts of a pivot truck, (not shown), and which bolsters are independent in their operation. Secured to each body casting at the top wall 10 thereof is a top cover plate 20, and the car floors, shown diagrammatically at 22, are provided with threshold castings 24. To permit passengers to pass from one car body to the other, a foot plate 26 is provided which is substantially circular in form and is supported by a body spacing and buffing element indicated generally at 28 and comprising a hollow pin positioned between the projections 13 and arranged in the recesses thereof. The pin 28 is supported by the castings 4, the latter having arcuate recesses 32 formed in the top walls thereof adjacent their front ends which receive the flange 34 dependent from the marginal edge of the head 36 of said pin 28. The head 36 is further provided with upstanding and outwardly flanged brackets 38 to which foot plate 26 is secured in any suitable manner.

As will be apparent, the pin 28 not only serves as a supporting element for the foot plate 26 but serves to connect the two car bodies through the engagement of the flange 34 with castings 4, whereby pulling stresses are transmitted from the bodies to the truck. The arcuate-shaped projections 13 define buffing areas and it will be apparent that buffing shocks will be transmitted from the bodies through the pin 28 to the truck, due to the position of the pin 28 between projections 13.

The pin 28, being arranged between the end portions of adjacent car bodies, more particularly being arranged between the projections 13 of castings 4, provides a construction in which excessive relative sidewise shifting of the car bodies is prevented. Due to variations in track structure or due to breaks in grade, the car bodies have a tendency to shift vertically relative to each other. A certain amount of both relative sidewise and vertical shifting is desirable and in fact necessary, in view of variations in track conditions, track curves, etc., but excessive relative vertical shifting should be prevented, and to accomplish this, the lower end of pin 28 is provided with oppositely arranged openings 40 in which a locking key 42 is arranged, the ends of which extend between lugs 44, formed with the bottom wall of the bolsters 18. The bottom walls of the bolsters 18 are also provided with stops to prevent loss of the key 42; one bolster having an integral abutment 46 adjacent the lugs 44, while the other bolster is provided with a removable abutment in the form of a cap screw 48 arranged adjacent lugs 44 and provided with a head 50 which serves as an abutment, as will be apparent.

Figs. 4 and 5 disclose a modified form of means for retaining the foot plate support and buffer in position. In the construction shown in these figures the pin 30 is hollow and is provided with a bottom end closure 52 apertured as at 54 to receive a bolt 56 which supports a locking key 58 and which bolt normally urges the key 58 upwardly to hold the latter in oppositely arranged slots 60 formed in the lower end of the pin, the key having its opposite ends positioned between oppositely arranged pairs of lugs 61. The bolt 56 is normally urged upwardly and retained in position by springs 62 seating between the bottom end closure 52 and a spring plate 64 on the bolt 56 adjacent the head 66 thereof.

In Fig. 1 the bolsters 4 are shown as being spaced from each other from end to end but if desired, the bolsters may be provided with inwardly facing projections 68 having engaging wear plates 70, as shown clearly in Fig. 6, thus serving to maintain the bolsters and connected body and truck bearings in their proper relative position.

From the above description it is believed that the construction will be fully apparent to those skilled in the art. In operation, in passing around curves, the two car bodies will swivel about the center of the spacing and buffing element 28 for the reason that the center of said element 28 is the center of the bearing surfaces of the connected bearings 14 and 16, and is also the center from which the arcs of the segmental bearing plates of the respective car bodies are struck. Obviously it is necessary to provide sufficient clearance between working parts to compensate for variations in track structure and to compensate for breaks in track grades and this has been done in designing the articulated joint of the present invention.

As each car body is supported by its own truck bolster and bearing plates, each body may oscillate or sway independently of or relative to the other. At the same time the bodies are prevented from excessive relative vertical shifting due to the key 42 which extends between the bolsters 18 and is carried by the pin 28.

Buffing between the adjacent end portions of the car bodies is taken care of by the pin 28 due to its position between the ends of the adjacent castings 4; the pin 28 being arranged in the recessed ends of the castings, and more particularly between the projections 13. Due to the positioning of the pin 28 it will be apparent that excessive relative sidewise shifting between the adjacent end portions of the car bodies is prevented. The pin 28 is provided with the before mentioned depending flange 34 which is engaged in the recesses 32 of the castings 4. It will be obvious to those skilled in the art that pulling stresses are transmitted from one body to the other and from the bodies to the truck by means of the engagement of the pin 28 in the recesses 32. The drawing herein does not disclose side bearings but obviously within the scope of the present invention, the bolsters 18 or the adjacent end portions of the bodies may be provided with any preferred or desired form of side bearing.

To disassemble the articulated joint shown in the drawing and described herein, the key 42 is first removed from its engagement with the pin 28, whereupon the pin 28, with the foot plate 26 may be elevated to be freed from the projections 13. This will permit either end portion of the car bodies to be elevated to disengage the connected body and truck bearings, as will be apparent. In the construction shown in Fig. 4, to disassemble the articulated joint the key 58 is removed from its engagement with the pin 30 and the bolsters 18, whereupon the key 30 may be removed just as hereinbefore described with reference to Fig. 2.

The drawing shows certain embodiments of the invention but it is to be understood that they are for illustrative purposes only and various changes in the form and proportions of the construction may be made within the scope of the appended claims without departing from the spirit of the invention.

What is claimed is:

1. In an articulated car comprising a plurality of car bodies, a truck beneath the adjacent end portions of said bodies, connected body and truck bearings, and a buffing element interposed between the adjacent end portions of said bodies supported thereby for retaining said bodies in spaced relation and for transmitting pulling stresses from the bodies to the truck.

2. In an articulated car comprising a plurality of car bodies, a truck for supporting the adjacent end portions of said bodies, connected body and truck bearings for permitting independent horizontal swiveling of the bodies, a combined body connecting element and buffer intermediate the adjacent end portions of said bodies for retaining said bodies in spaced relation, said element being the center of rotation of the bodies and being supported by the latter whereby pulling stresses are transmitted from the bodies to the truck.

3. In an articulated car comprising a plurality of car bodies, a truck beneath the bodies, bearings connecting said bodies and truck, a foot plate lapping the adjacent end portions of said bodies, and a foot plate supporting element interposed between and supported by the adjacent end portions of said bodies.

4. In an articulated car comprising a plurality of car bodies, a truck beneath the bodies, bearings connecting said bodies and truck, a foot plate lapping the adjacent end portions of said bodies, and a buffing element supported by the adjacent end portions of said bodies and removably positioned between the bearings, said element being adapted to support the foot plate.

5. In an articulated car comprising a pair of car bodies with their adjacent end portions arranged in spaced relation, a foot plate bridging the space between said bodies, and means interposed between and supported by the adjacent end portions of said bodies for supporting the foot plate.

6. In an articulated car comprising a pair of car bodies with their adjacent end portions arranged in spaced relation, a foot plate bridging the space between said bodies, and means interposed between and supported by the adjacent end portions of said bodies for supporting the foot plate and for preventing excessive relative sidewise shifting of said bodies.

7. In an articulated car comprising a pair of car bodies having adjacent end portions arranged in spaced relation, a foot plate bridging the space between said adjacent end portions, and a buffing element interposed between the adjacent end portions and supported thereby for preventing excessive relative sidewise shifting of the bodies and for supporting the foot plate.

8. In an articulated car comprising a pair of car bodies having adjacent end portions arranged in spaced relation, a truck for supporting the adjacent end portions, said truck having a pair of independent bolsters, body bearings for said end portions respectively engaging the bolsters, a combined buffing element and body spacer arranged between the adjacent end portions of the bodies and supported thereby for transmitting pulling stresses from the bodies to the truck and for preventing excessive relative sidewise shifting of the bodies, and a foot plate supported by the buffing element and bridging the space between the adjacent end portions of said bodies.

9. A buffing element for the adjacent end portions of two bodies of an articulated car comprising a cylindrical member having a vertical flange around its periphery extending above and below the upper end of the member.

10. In an articulated car comprising a pair of car bodies the adjacent end portions of which are provided with vertically arranged recesses, a truck for supporting the adjacent end portions, means for transmitting pulling stresses from the bodies to the truck and for preventing excessive relative sidewise shifting of the bodies comprising a buffing element arranged in the recesses and connecting the bodies, said element extending into the truck, and means connecting said element to a truck part to prevent excessive relative vertical shifting of the bodies.

11. A buffing element for the adjacent end portions of two bodies of an articulated car comprising a headed member arranged between the adjacent end portions of said bodies and provided with an upwardly extending marginal flange adapted to support a foot plate.

12. In an articulated car, a pair of car bodies having recessed projections at their adjacent end portions, means for preventing relative sidewise shifting of the bodies and for connecting the bodies to transmit pulling stresses from one to the other comprising a member arranged in the recesses in said projections and supported by the bodies at their adjacent end portions.

13. In an articulated car comprising a pair of car bodies, a truck beneath the adjacent end portions of said bodies provided with a pair of bolsters, bearings respectively connecting the bodies with said bolsters, and means connecting said bodies and truck for transmitting pulling stresses from the bodies to the truck and for preventing relative vertical and sidewise shifting comprising a buffing element interposed between and supported by the adjacent end portions of said bodies to connect the bodies and to retain them in spaced relation.

14. In an articulated car, a pair of car bodies arranged end to end, and means for supporting a foot plate in overlapping relation with respect to said end portions of said bodies comprising a pin arranged between the adjacent end portions and having a head lapping said end portions and supported thereby, said foot plate being secured to said head.

15. In an articulated car, a pair of car bodies and means for supporting a foot plate in overlapping relation with respect to the adjacent end portions of said bodies comprising a pin arranged between the adjacent end portions and adapted to transmit buffing shocks from one body to another, said pin having a head lapping said end portions and supported thereby and said foot plate being secured to said head.

In witness whereof I have hereunto set my hand.

JOHN B. D. THOMPSON.